United States Patent [19]

Mainquist et al.

[11] Patent Number: 5,347,886
[45] Date of Patent: Sep. 20, 1994

[54] LUBRICATION CONTROL WITH INCREASED LUBRICATION DURING SHIFT AND DURING CRUISE FOR A MULTI-PLATE FRICTION DEVICE FOR AN AUTOMATIC TRANSMISSION

[75] Inventors: James K. Mainquist, Troy; Robert C. Downs, Clarkston; Larry T. Nitz, Troy; Kyle K. Kinsey, Highland, all of Mich.

[73] Assignee: Saturn Corporation, Troy, Mich.

[21] Appl. No.: 927,106

[22] Filed: Aug. 10, 1992

[51] Int. Cl.⁵ .................. F16H 57/04; B60K 41/10
[52] U.S. Cl. .................. 477/161; 475/159; 477/158
[58] Field of Search ............ 192/87.1, 85 R; 74/467, 74/867; 364/424.1; 475/159

[56] References Cited

U.S. PATENT DOCUMENTS

| | | | |
|---|---|---|---|
| 4,275,617 | 6/1981 | Kalns | 475/159 X |
| 4,751,858 | 6/1988 | Iwatsuki | 74/867 |
| 5,222,418 | 6/1993 | Murota | 475/159 X |

Primary Examiner—Dirk Wright
Assistant Examiner—Khoi Q. Ta
Attorney, Agent, or Firm—Donald F. Scherer

[57] ABSTRACT

A lubrication system for multi-plate clutch assemblies is controlled to provide increased lube flow. During steady state operation, lube flow is increased periodically for a short time interval. At other times during steady state operation, the lube flow is maintained at a level requiring minimum fluid flow for the system.

3 Claims, 4 Drawing Sheets

LUBRICATION CONTROL WITH INCREASED LUBRICATION DURING SHIFT AND DURING CRUISE FOR A MULTI-PLATE FRICTION DEVICE FOR AN AUTOMATIC TRANSMISSION

BACKGROUND OF THE INVENTION

This invention relates to lubrication control systems for power transmissions, and more particularly, to lube systems for rotating clutch assemblies in power transmissions.

Parallel shaft or countershaft type automatic transmissions employ a rotating multi-disc ratio clutch for each gear ratio in the transmission. Since only one ratio clutch is fully engaged during steady state transmission operation, the remaining clutches are in an open running or free running condition and therefore contribute to spin losses in the transmission. Lube oil is continually supplied to the clutches and therefore a viscous drag occurs in the open running clutches between adjacent discs which are rotating at a speed differential. The spin losses are proportional to the oil film thickness or the amount of lube flow across the discs and the speed differential.

SUMMARY OF THE INVENTION

The present invention seeks to reduce the spin losses and thereby increase the overall efficiency of parallel shaft transmissions by minimizing the lube flow to the clutches during steady state operation, and to provide increased lube flow to the clutches when a ratio interchange is anticipated.

The lube flow is controlled by a valve member responsive to system pressure for directing fluid to the lube circuit and the cooler circuit, or to the lube circuit only. The system pressure is responsive to an electronic control unit (ECU) which, in response to the vehicle parameters, commands the system pressure to a high level in anticipation of a ratio interchange. The elevated system pressure will control the lube valve member to direct more flow to the lube circuit thereby ensuring that an increased amount of oil will be present at the clutches when a ratio interchange occurs.

It is therefore an object of this invention to provide an improved lube flow control for a transmission, wherein the lube flow to the multi-plate friction devices in the transmission is increased when a ratio interchange is about to occur.

It is another object of this invention to provide an improved lube flow control, as described above, wherein a flow control valve, which is responsive to system pressure, is controlled to increase the lube flow periodically during steady state operation as well as in anticipation of a ratio interchange.

These and other objects and advantages of the present invention will be more apparent from the following description and drawings.

DESCRIPTION OF THE EXEMPLARY EMBODIMENT

Figure 1:
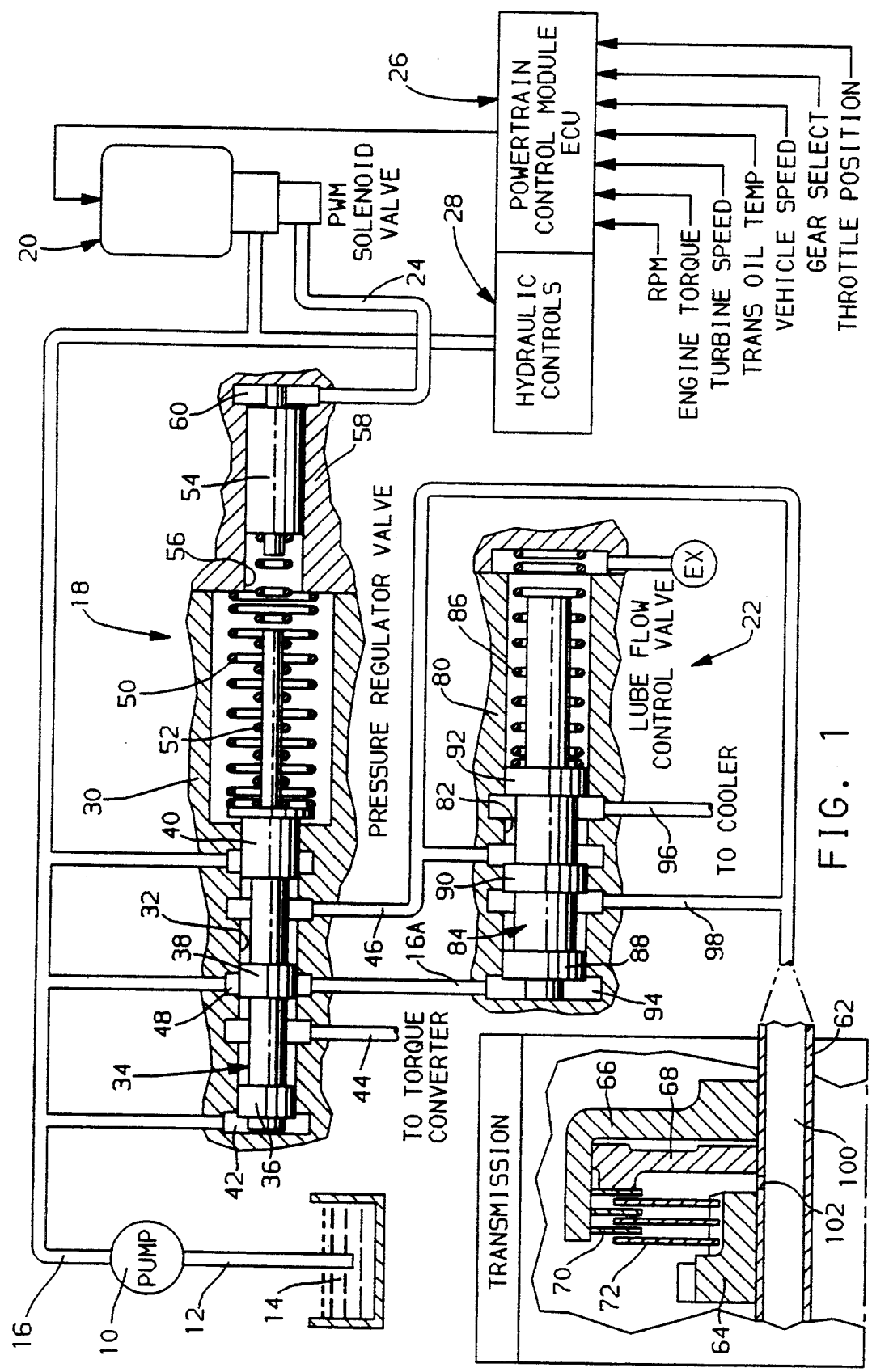
FIG. 1 is a schematic representation of a portion of a transmission control system incorporating the present invention.

Referring to FIG. 1, there is seen a hydraulic control system incorporating a positive displacement pump 10 which draws fluid through a passage 12 from a reservoir 14 for delivery to a main pressure passage 16 which is disposed in fluid communication with a pressure regulator valve 18, a pulse width modulated solenoid valve 20 and a lube flow control valve 22.

The pulse width modulated valve 20 is a conventional electronic control valve which receives fluid from the pump 10 through the passage 16 and delivers or directs fluid at, a controlled pressure, to a passage 24. The pressure generated by the pulse width modulated valve 20 and the passage 24 is a result of an electrical signal or duty cycle received from the conventional powertrain control module ECU, designated 26.

As is well known, the ECU 26 receives various vehicle parameters, such as engine rpm, engine torque, torque converter turbine speed, oil temperature, vehicle speed, the gear selected and the throttle position. These signals are operated on in a well known manner by the ECU for delivery to the pulse width modulated valve 20 and also to the hydraulic control mechanism 28.

The hydraulic control mechanism 28 receives fluid pressure via the main passage 16 for delivery to various friction devices and valve members (not shown), which in turn serve to control the transmission ratio between the input and output shafts of a transmission, not shown.

The members of the hydraulic control 28 are conventional members, such that it is not believed that a more detailed description of their operation and structure is required, since those skilled in the art will be familiar with such devices.

The regulator valve 18 includes a valve body 30 having a bore 32 in which is slidably disposed a spool valve 34. The spool valve 34 includes three equal diameter spaced lands 36, 38 and 40. The valve land 36 cooperates with the end of valve bore 32 to form a pressure control chamber 42 which is disposed in fluid communication with the passage 16. The valve land 38 is positioned to provide controlled communication between the passage 16 and the torque converter passage 44, which is in fluid communication with the valve bore 32. The valve land 40 is disposed to provide controlled communication between the passage 16 and a lube passage 46. The passage 16 is connected to an annular port 48 formed around the valve bore 32 such that fluid flow to passage 16a is continuously permitted regardless of the position of the valve spool 34.

A pair of compression springs 50 and 52 engage the right end of the valve spool 34 to urge the valve spool 34 to the spring set position shown. The spring 52 is also disposed in abutment with a plug member 54 which is slidably disposed in a valve bore 56 formed in a housing 58 and secured to the valve body 30. The plug 54 cooperates with the valve bore 56 to define a control chamber 60 which is in fluid communication with the passage 24. As previously described, the passage 24 has the pressure controlled by the pulse width modulated solenoid valve 20.

The valve spool 34 has leftward forces imposed thereon by the springs 50 and 52. The spring 52 provides a variable force which is responsive to the pressure in passage 24. In other words, as the pressure in passage 24 increases, the plug 54 will move leftward, thereby increasing the force in spring 52.

The valve spool 34 has rightward forces imposed thereon by fluid pressure in chamber 42 acting on the end of land 36 to urge the valve spool 34 rightward against the forces in the springs 50 and 52. When sufficient pressure has developed in passage 16 to begin movement of the valve spool 34 rightward, the valve land 38 will open the passage 16 at the annular port 48 to the passage 44 for delivery to the torque converter not shown.

Further increases in the pressure in passage 16 will cause the valve land 40 to open the passage 16 to the lube passage 46. When this passage is open, the excess fluid in the passage 16 will be directed to the lube circuit such that further increases in the pressure in passage 16 will not be significant within the system. The lube passage 46 is connected to the lube flow control valve 22 and to one or more shafts in the transmission, such as that shown at 62.

The shaft 62 has a gear member 64 rotatably mounted thereon and a clutch housing 66 rotatably affixed thereto. The clutch housing 66 has a piston member 68 slidably disposed thereon for controlled engagement with a plurality of friction plates or discs 70. The friction discs 70 will be forced into frictional engagement with one or more of the friction plates or discs 72 which are drivingly connected to the gear 64. The actuation of the piston 68 is controlled by the hydraulic control mechanism 28, such that when a gear ratio within the transmission requires the use of gear member 64, the piston 68 will be actuated by fluid pressure.

The housing 66, piston 68 and friction plates 70 and 72 comprise a conventional fluid operated multi-plate friction devices. The structures of these units are will known, as are the structures of the transmissions in which these clutches are utilized. One such clutch assembly can be found in U.S. Pat. No. 5,054,186, issued to Weselak on Oct. 8, 1991, and examples of parallel shaft or countershaft power transmissions can be seen in U.S. Pat. No. 4,843,551, issued to Milunas on Jun. 27, 1989; U.S. Pat. No. 5,009,116, issued to Ordo et al. on Apr. 23, 1991; or in U.S. Ser. No. 07/776,021, filed Oct. 15, 1991, and allowed Mar. 23, 1992, all of the above references assigned to the assignee of the present invention.

The lube flow control valve 22 includes a valve body 80 in which is formed a valve bore 82. A valve spool 84 is slidably disposed in the valve bore 82 and urged leftwardly therein by a conventional compression spring 86. The valve spool 84 has three equal diameter spaced lands 88, 90 and 92. The valve land 88 cooperates with the left end of valve bore 82 to provide a control chamber 94 which is in fluid communication with the main system pressure in passage 16a.

The valve lands 90 and 92 cooperate to provide fluid communication between the lube passage 46 and a cooler passage 96 when the valve spool 84 is in the spring set position shown. The valve spool 84 is moved rightwardly against the spring 86 by fluid pressure in chamber 94 to permit fluid communication between passage 46 and a secondary lube passage 98 for delivery of the maximum amount of lube pressure to a passage 100 formed in the shaft 62.

The lube oil distributed to passage 100 is directed through a radial passage 102 for distribution between the plates 70 and 72. Also, when the valve spool 84 is moved rightwardly against the spring 86, the cooler passage 96 is disconnected from the lube passage 46 such that the entire overflow or excess fluid from pump 10 is available for distribution to the lube circuit.

From the above description, it should be evident that the amount of fluid to the lube circuit can be controlled at two distinct levels. In the spring set position shown, the lube flow to the lubrication circuit is minimal such that there will not be excess fluid disposed between the plates 70 and 72, thereby reducing the viscous drag to a minimum to provide improved efficiency. However, prior to the clutch being engaged, and periodically during steady state operation when the plates 70 and 72 are in the open running condition, it is desirable to inject an increased amount of lubrication fluid to the system so as to improve the operating conditions of the clutch members.

The lube flow control valve 22 is controlled between the spring set and pressure set conditions by the level in the fluid pressure within passage 16a. The pressure in passage 16a, in turn, is controlled by the pulse width modulated solenoid valve 20, as directed by the ECU 26. The flow diagram of FIG. 2 illustrates a portion of an algorithm which is operable to control the ECU 26 so as to permit control of the lube flow control valve 22 between a low flow or spring set condition and a high flow or pressure set condition.

Figure 2:
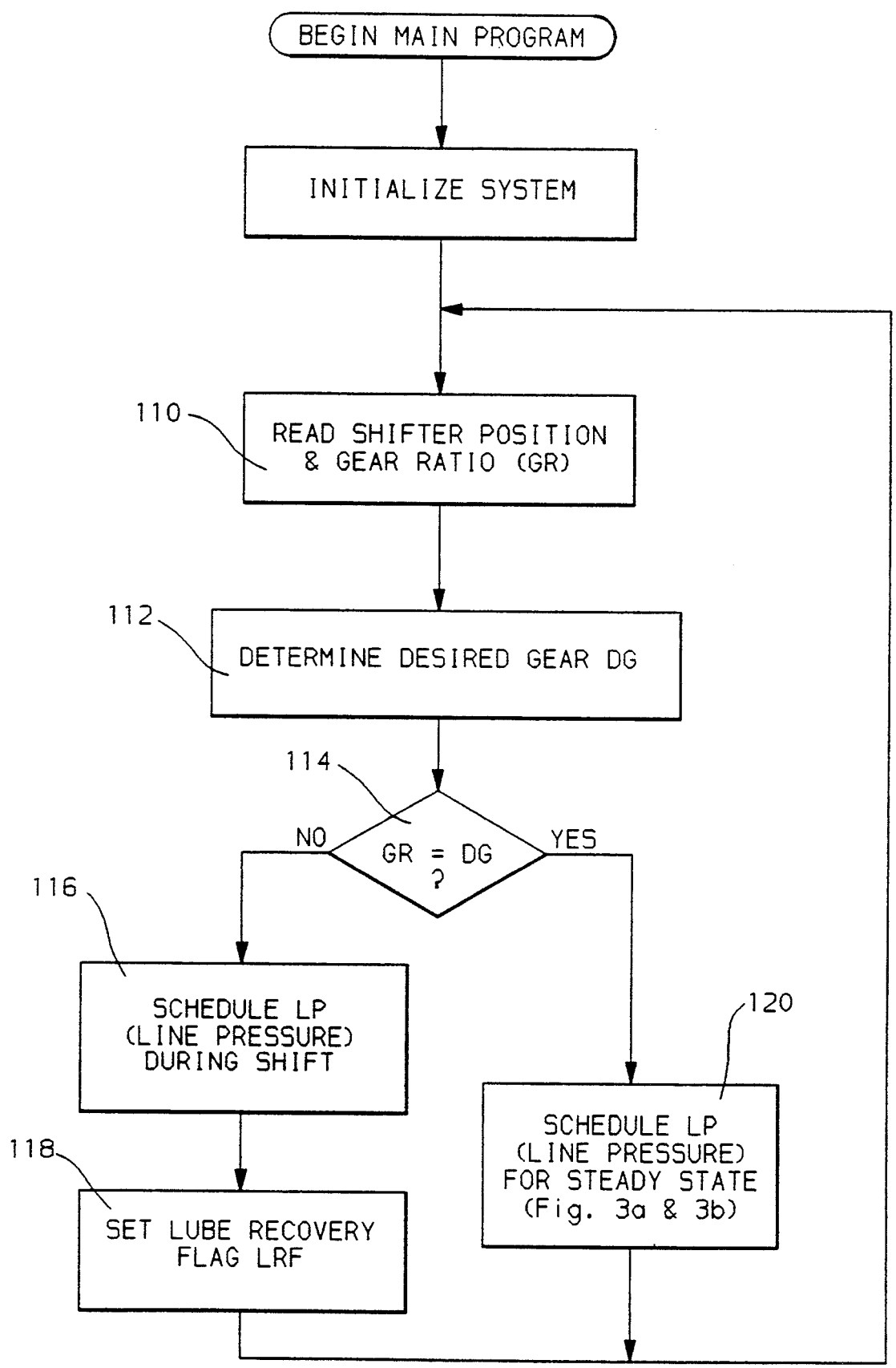
FIG. 2 is a flow diagram of a portion of an algorithm utilized by an electronic control unit which is adapted to control the transmission.

When the flow diagram of FIG. 2 is operable to energize the system, that is, establish the basic parameters or constants within the ECU 26, such that during normal operation, the inner loop can be continually performed. During the operation of the algorithm, it is determined in block 110 what the current gear ratio (GR) is and in block 112 it is determined what the desired gear ratio (DG) is, and in block 114 it is determined if the current gear ratio is equal to the desired gear ratio (GR=DG). If these are not equal, the algorithm determines in block 116 that the line pressure (LP) should be increased as a ratio interchange is occurring. At this point, the ECU 26 issues a signal to the pulse width modulated valve 20 to require an increase in system pressure which, as described above, will result in the lube flow control valve 22 being moved to the pressure set position for increased lube flow.

In block 118, the lube recovery flag (LRF) is set which discontinues the high pressure requirement signal at the ECU 26. From the block 118, the cycle is repeated. If at block 114 it is determined that the desired gear ratio (DG) and the current gear ratio (GR) are equal, the algorithm performs the function described in block 120, which is to schedule line pressure (LP) for steady state, as described in FIGS. 3a and 3b.

Figure 3A:
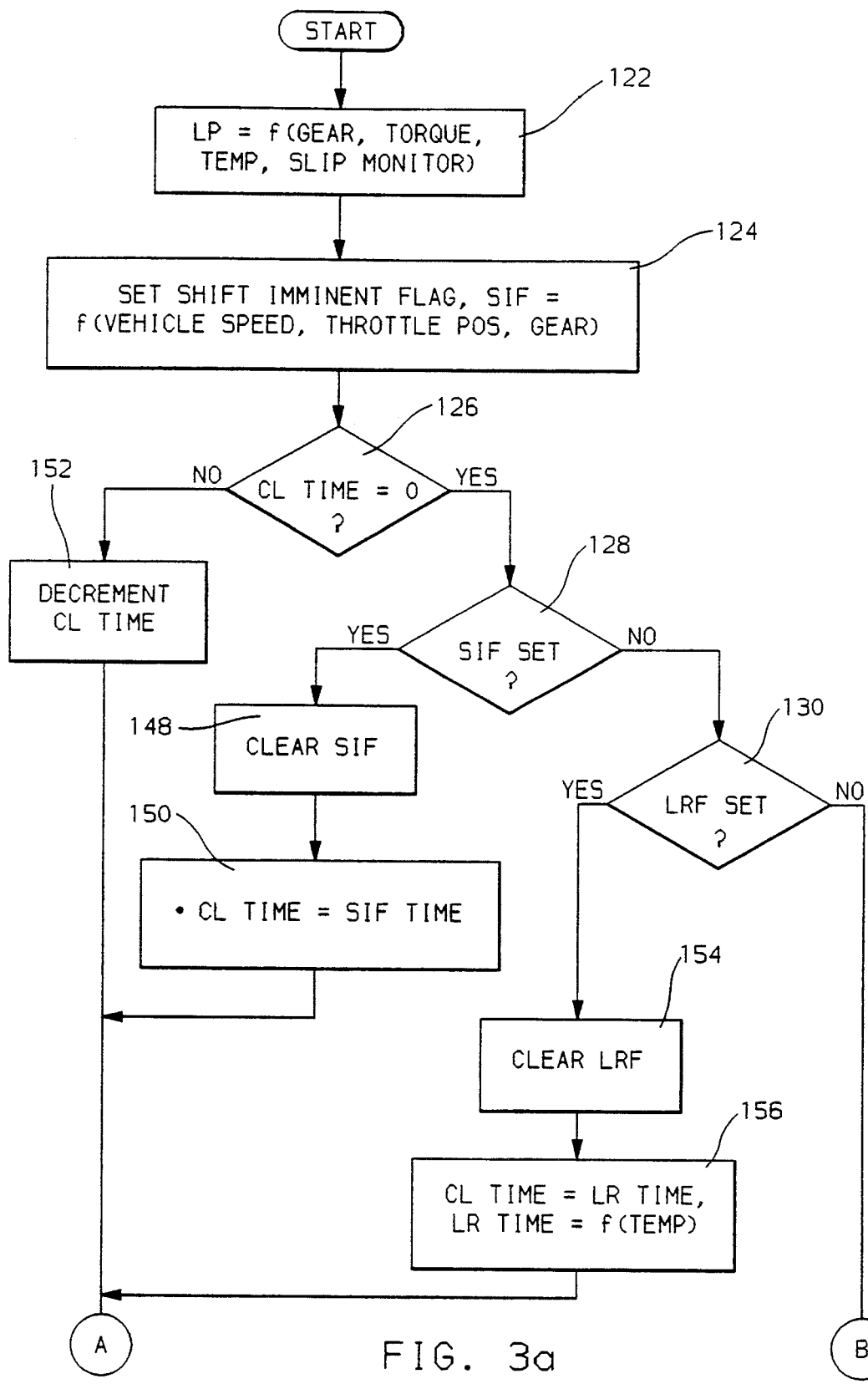
FIGS. 3a and 3b are flow diagrams of an algorithm which operates within the algorithm described in FIG. 2.
Figure 3B:
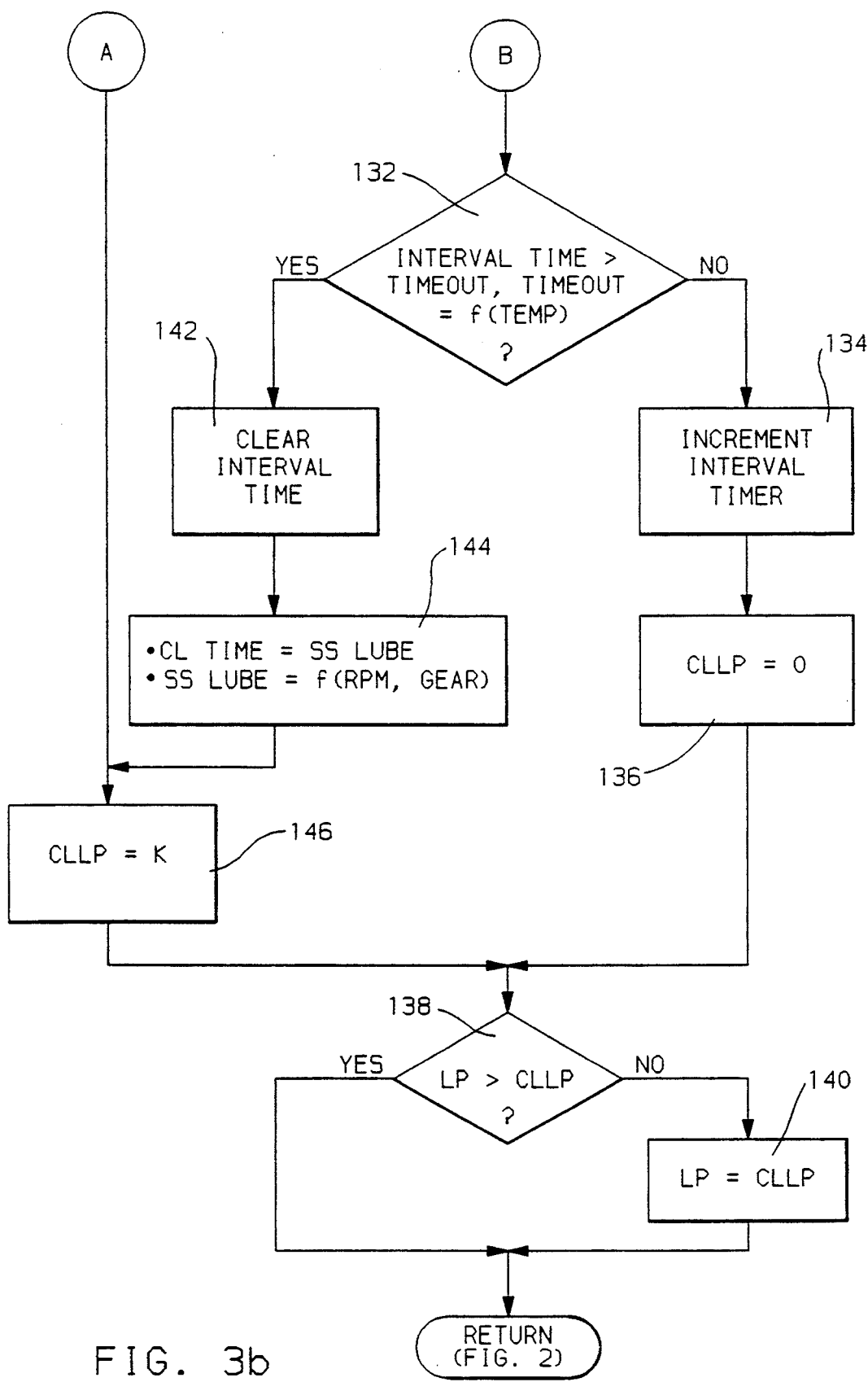

In FIG. 3a at block 122, the algorithm determines the proper line pressure (LP) as a function of the gear ratio, engine torque and other parameters. With the line pressure thus established, the algorithm continues to block 124, wherein a shift imminent flag (SIF) is set, if the conditions, as determined by the vehicle parameters, are such that a shift is likely to be commanded in the near future. the algorithm then passes to block 126, wherein the amount of time (CL) that the current steady state operation has been occurring, will be evaluated.

If the time between lube flow increases is equal to zero (CL TIME=0), the algorithm will pass to block 128, which will review whether the shift imminent flag (SIF) was set in block 124. If the shift imminent flag (SIF) is not set, the algorithm proceeds to block 130, which determines if the lube recovery flag (LRF) was set at block 118. If the lube recovery flag (LRF) is not set, the algorithm proceeds to block 132, which determines whether there has been a shift time interval between the last evaluation of line pressure during the steady state condition.

The interval time period is a function of temperature and is equal to the time between lube shots at steady state. If the interval time which has passed since the last lube shot is not sufficient, the algorithm proceeds to block 134, which increments the timer and permits the clutch line pressure (CLLP) to go to a minimum value (CLLP=0) at block 136. The algorithm then determines at block 138 if the current line pressure is greater than the clutch lube line pressure required for maximum flow (LP>CLLP), and as a result of this comparison, will set the line pressure equal to the clutch line pressure at block 140 (LP=CLLP) and then return to block 120.

At block 132, if the interval time was greater than the time between lube shots, the algorithm will clear the interval time at block 142, and proceed to block 144 where the amount of time required to maintain proper lube at the clutches during steady state will be determined as a function of engine rpm and gear ratio, after which, at block 146, the pulse width modulated solenoid valve 20 will be energized to provide maximum system pressure, such that the clutch lube line pressure will be raised to a maximum, thereby providing an increase in lube oil at the friction plates 70 and 72, after which, the algorithm will perform the step at block 138 and then return to block 120.

If at block 128 the shift imminent flag was set, that is a shift is about to occur, the algorithm with continue to block 148 which will clear the shift imminent flag and set the steady state line pressure time at block 150, after which the algorithm passes to block 146 where an increase in lube pressure occurs, resulting in increased lube flow to the friction plates 70 and 72.

If at block 126 the amount of time that the steady state line pressure has been increased to provide elevated lube flow is not equal to zero, the algorithm will pass to block 152 which will decrement the time and then pass the algorithm to block 146 which maintains the lube flow at maximum. The algorithm then continues on to block 120, after which the entire loop is repeated.

If the lube recovery flag (LRF) has been set at block 118, then block 130 will direct the algorithm to block 154, which will clear the lube recovery flag. The algorithm passes to block 156 which will set the CL time to the time (LR) required to replenish the friction plates with lube oil. LR time is a function of temperature.

It should be obvious at this point, that other than the amount of time that the steady state lube pressure is evaluated for increased flow at block 126, the lube flow will remain elevated. However, each time the algorithm passes through this loop, the time value is decremented and will reach a zero value after a predetermined number of loops within the algorithm.

From the foregoing description, it should be appreciated that the lube pressure and flow within the transmission is maintained at a relatively low value except when a shift or ratio interchange is about to occur, or it is determined that the transmission has been operating in a steady state condition for a predetermined time. Thus, when the vehicle is operating at a fairly constant speed along the highway, the lube flow will be increased periodically to ensure that a minimum oil film is always maintained at the friction plates. However, when the vehicle is being operated under conditions where upshifting and downshifting occurs quite frequently, for example, during city traffic driving, this control will ensure that significant amounts of fluid flow are provided at the multi-plate friction devices, as required during ratio interchanges.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A lube control for a power transmission having a plurality of multi-plate clutch assemblies, said control comprising:

system pressure control valve means for controlling a system pressure within a range;

lube flow control valve means for controlling fluid flow to the clutch assemblies and having a plurality of operating positions including a low lube flow position and a high lube flow position, a low pressure outlet, a lube flow outlet and control chamber means in fluid communication with said system pressure control valve means, said lube flow control valve means being responsive to the system pressure for communicating fluid to both said low pressure outlet and said lube flow outlet when the low lube flow position is established and to said lube flow outlet when said high lube flow position is established;

means for determining when a change in the amount of lube flow is required;

means for controlling the system pressure control valve means to establish a high system pressure within said range when increased lube flow is required;

means for determining if the transmission does not have a ratio interchange for a predetermined period of time;

and said means for controlling the system pressure control valve means being operable to establish said high pressure if the predetermined period of time has elapsed.

2. A lube control for a power transmission having a plurality of multi-plate clutch assemblies, that are selectively engaged and disengaged individually to establish drive ratios in the transmission, said control comprising:

system pressure control valve means for controlling a system pressure within a range;

lube flow control valve means for controlling fluid flow to the clutch assemblies and having a plurality of operating positions including a low lube flow position and a high lube flow position, a low pressure outlet, a lube flow outlet and control chamber means in fluid communication with said system pressure control valve means, said lube flow control valve means being responsive to the system pressure for communicating fluid to both said low pressure outlet and said lube flow outlet when the low lube flow position is established and to said lube flow outlet when said high lube flow position is established;

means for determining when engagement of a clutch assembly is imminent;

means for determining when a change in the amount of lube flow is required;

means for controlling the system pressure control valve means to establish a high system pressure within said range when the engagement of the clutch is imminent;

means for determining if the transmission does not have a ratio interchange for a predetermined period of time;

and said means for controlling the system pressure control valve means being operable to establish said high system pressure if the predetermined period of time has elapsed.

3. A lube control for a power transmission having a plurality of multi-plate friction devices which are selectively interchanged to provide a ratio interchange in the transmission, said control comprising:

system pressure control valve means for controlling a system pressure within a range;

lube flow control valve means for controlling fluid flow to the clutch assemblies and having a plurality of operating positions including a low lube flow position and a high lube flow position, a low pressure outlet, a lube flow outlet and control chamber means in fluid communication with said system pressure control valve means, said lube flow control valve means being responsive to the system pressure for communicating fluid to both said low pressure outlet and said lube flow outlet when the low lube flow position is established and to said lube flow outlet when said high lube flow position is established;

means for determining when an interchange is imminent;

means for determining when a change in the amount of lube flow is required;

means for controlling the system pressure control valve means to establish a high pressure within said range when to provide increased lube flow during a ratio interchange;

means for determining if the transmission does not have a ratio interchange for a predetermined period of time;

and said means for controlling the system pressure control valve means being operable to increase the system pressure if the predetermined period of time has elapsed.

* * * * *